H. TILDEN.
Coffee Pot.
No. 61,122.
Patented Jan. 8, 1867.
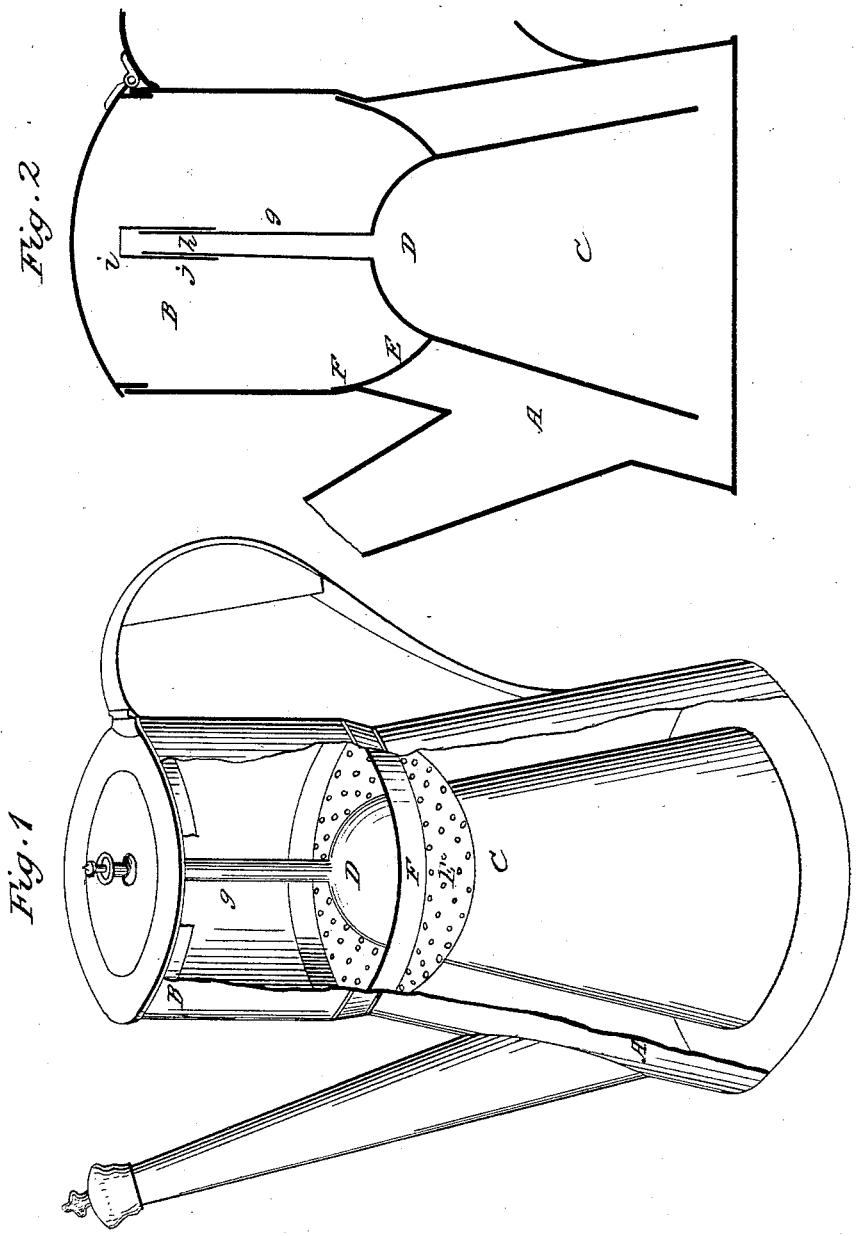

United States Patent Office.

HOWARD TILDEN, OF BOSTON, MASSACHUSETTS.

Letters Patent No. 61,122, dated January 8, 1867.

IMPROVED COFFEE-POT.

*The Schedule referred to in these Letters Patent and making part of the same.*

TO ALL WHOM IT MAY CONCERN:

Be it known that I, HOWARD TILDEN, of Boston, in the county of Suffolk, State of Massachusetts, have invented certain new and useful improvements in Coffee-Pots; and I do hereby declare the following to be a full and exact description of the same, reference being had to the drawings, which accompany and form a part of this specification, in which—

Figure I represents the pot in perspective, with portions of the front parts removed so as to show the arrangements of the interior parts.

Figure II, a bisected vertical view, showing the form of the interior parts.

The same letters represent corresponding parts in the different figures. The parts not in any way connected with my invention I have thought best not to designate in particular.

Letter A represents the base or lower part of the body of the coffee-pot; B the upper part thereof; both these being united in one; C a cone-shaped cylinder, with its small end covered with the concave cap D, in the manner represented. E a strainer surrounding the upper end of the cylinder C, made in shape and arranged as seen in Fig. II, for reasons hereinafter stated. F a rim or band formed upon the outer edge of the strainer E, $g$ a small tube for letting off the air from the cylinder C when it is put down into the body of the pot. This tube is provided with a small opening, H, as seen in Fig. II. $i$ a cap fitting close to the tube $g$ and provided with a small opening, $j$, to correspond to the opening $h$.

In constructing the part B, I contract the lower part of it, as may be seen in Fig. II. The rim F is placed to correspond with the above inclination of the sides of the base of the part B, as can be seen in Fig. II. This fitting of the two parts above mentioned keeps the strainer E in proper position and prevents the ground coffee from falling into the lower part of the pot A. The strainer is made in the hemispherical form, so that the ground coffee may gather around the cap D, and thus afford opportunity for the air to pass freely through the openings in the outer part of the strainer to the lower part of the pot while the coffee is being poured out the spout. The object of the chamber produced beneath the concave cap D is as follows: The strainer, with the attaching parts, the cone C, the pipe $g$, with its cap turned so as to bring the openings $h$ and $j$ in conjunction, being in position as seen in Figs. I and II, water is poured in until it rises a little in view at the base of the cap D. Now the cap $i$ is turned so as to close the opening $h$; the coffee is put in upon the strainer E, and the pot set upon the stove. As the heat increases, the expansion of the air in the chamber D forces the water down within the cylinder C, and consequently makes it rise through the strainer, and thus soaks the ground coffee before the water comes to boiling heat. This is one particular feature of my invention, and considered one of much importance. As the heat continues and the water begins to boil, the vapor formed in the cylinder C will cause the water to rise still more above the strainer E. The desirable properties of the coffee will be extracted in one or two minutes, when the pot may be removed, and the vapor below condenses, and all the liquid in the upper part of the pot filters through to the part below, and thus the bitter principle of the coffee, so undesirable in coffee for ordinary purposes, is not extracted as when the ground coffee is allowed in the liquid after the process of cooking, while the short boiling mentioned above is sufficient to extract that richness which is much praised by Professor Liebig.

The nature of my invention relates to the form and manner of combining the strainer E with the other parts, as also the use of the air-chamber D in conjunction with the cylinder C.

What I claim as my invention, and desire to secure by Letters Patent, is—

The use of the strainer E in form as shown, when provided with the rim F and the air-chamber D, in combination with the cylinder C, the tube $g$, and the body of the pot A and B, the whole constructed substantially as described and for the purposes set forth.

HOWARD TILDEN.

Witnesses:
DANIEL C. COLLEY,
A. T. WING.